United States Patent [19]
Konstant

[11] 3,938,668
[45] Feb. 17, 1976

[54] GUIDERAIL SYSTEM FOR STORAGE RACKS

[75] Inventor: Anthony N. Konstant, Mount Prospect, Ill.

[73] Assignee: Speedrack Inc., Skokie, Ill.

[22] Filed: Feb. 21, 1974

[21] Appl. No.: 444,355

[52] U.S. Cl. ............. 211/134; 211/182; 248/188.8; 256/13.1; 403/174; 403/178
[51] Int. Cl.² ......................................... A47F 5/00
[58] Field of Search .......... 211/134, 148, 177, 182; 248/188.8; 403/172, 174, 178, 295; 256/1, 13.1; 214/16.4 A, 16.4 B, 38 BB; 52/174

[56] References Cited
UNITED STATES PATENTS

| 406,966 | 7/1889 | Strange | 211/182 |
|---|---|---|---|
| 2,894,641 | 7/1959 | Edwards | 211/182 X |
| 2,958,425 | 11/1960 | Best | 211/182 X |
| 3,127,995 | 4/1964 | Mosinski | 211/148 |
| 3,392,947 | 7/1968 | Keliehor | 211/182 X |
| 3,525,442 | 8/1970 | Novales | 211/182 X |
| 3,679,067 | 7/1972 | Konstant | 211/182 |
| 3,710,524 | 1/1973 | Seiz | 256/13.1 X |
| 3,727,778 | 4/1973 | Hollenbach | 214/16.4 A X |
| 3,759,403 | 9/1973 | Fernstrom | 214/16.4 A |
| 3,797,408 | 3/1974 | Barber et al. | 214/16.4 A X |

FOREIGN PATENTS OR APPLICATIONS

| 188,408 | 3/1964 | Sweden | 403/295 |
|---|---|---|---|
| 271,049 | 10/1950 | Switzerland | 403/174 |

*Primary Examiner*—Roy D. Frazier
*Assistant Examiner*—Thomas J. Holko
*Attorney, Agent, or Firm*—Fitch, Even, Tabin & Luedeka

[57] ABSTRACT

A guiderail system for floor-mounted storage racks which is located generally adjacent the access aisles. Tubular guiderails are supported by brackets which include a pair of sockets extending in opposite horizontal directions which sockets are proportioned to closely interfit within the tubular guiderail. A main plate portion of the bracket is disposed under the storage rack column or support to transfer the load carried by the storage rack to the bracket and thus stabilize and rigidify the guiderail system.

3 Claims, 9 Drawing Figures

GUIDERAIL SYSTEM FOR STORAGE RACKS

The present invention relates to guiderails and is particularly directed to guiderail assemblies for use with storage racks that will be serviced by mechanical lift equipment.

Lift trucks are commonly employed to move goods throughout warehouse storage, and these trucks, often called "order pickers," move into and out of the rack aisles in order to transport the various items which are stored on the storage rack shelves. The items, often in palletized form, are carried in front of trucks on forks or booms which form an integral part of the truck itself. The rack aisles in which these trucks operate are usually narrow in order to make the maximum utilization of warehouse floor space. As a consequence, it is common for such equipment to often strike the racks in moving along such relatively narrow aisles.

In order to avoid potential damage to the storage racks, it has become desirous to locate guiderails just above floor level which will restrain the lateral movement of such lift trucks and thereby prevent them from striking the racks. Moreover, some mechanical lift equipment is provided with horizontally disposed guide wheels, just above floor level, which will contact such guiderails and move smoothly therealong.

It is an object of the present invention to provide improved guiderail assemblies for use with storage racks. Another object of the invention is to provide an improved support arrangement for guiderails for storage racks. A further object of the invention is to provide an improved rigid guiderail system for storage racks that minimizes erection time and effort. These and other objects of the invention will be apparent from a reading of the following detailed description when taken in conjunction with the accompanying drawings wherein.

Figure 1:
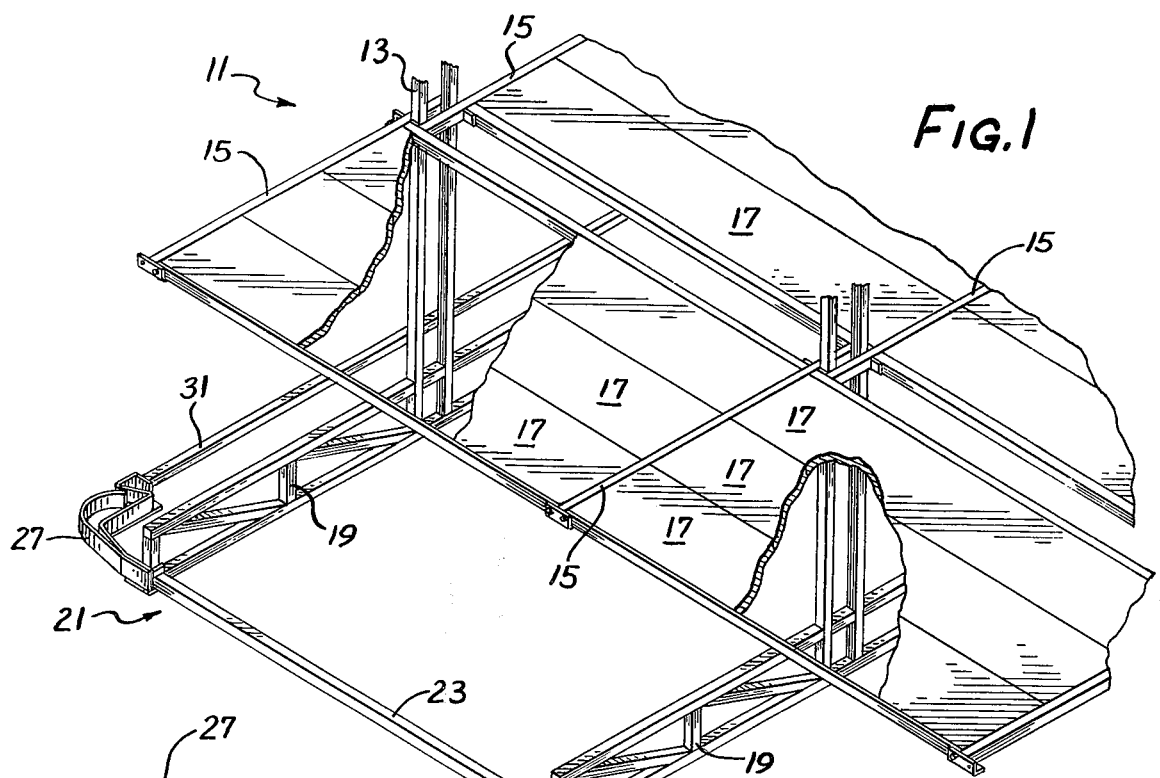
FIG. 1 is a perspective view, with portions broken away, illustrating a cantilever rack arrangement using a guiderail assembly embodying various features of the invention.

FIG. 1 illustrates a storage rack arrangement designed for use with mechanical lift equipment which employs cantilever storage racks 11. The cantilever racks 11 include a central column arrangement 13 from which cantilever arms 15 are supported, extending in opposite directions. Shelves 17 are preferably supported between adjacent pairs of cantilever arms 15 so as to provide a substantially continuous storage space at a desired vertical level on either side of the cantilever rack columns 13.

Each central column arrangement 13 is supported on the floor by an elongated base 19 which preferably extends the full depth of the cantilever rack 11. Unless the floor itself is used for the lowest level of storage, or unless the racks 11 are being used to store rigid items, for example, rod or pipe, the cantilever rack bases 19 will normally be adapted to support shelving (not shown) in substantially the same manner as the shelves 17 are supported by the cantilever arms 15, to thereby provide a continuous storage space at a level a few inches above the floor.

The storage rack 11 is equipped with a guiderail assembly 21 that provides a continuous vertical guide surface along the entire edge of the storage rack 11; and thus, the guiderail assembly 21 essentially defines the edge of the aisle serving that storage rack bay. The illustrated guiderail assembly 21 includes a number of lengths or sections of tubular guiderail 23 which are supported by dual brackets 25. At the entrance to the aisle, a spring entry assembly 27 protects the storage rack from impacts by mechanical lift equipment, which impacts might come from different directions of incidence. The spring entry assembly 27 is disclosed in detail in my copending patent application Ser. No. 265,229, filed June 22, 1972, and now U.S. Pat. No. 3,796,410.

Figure 2:
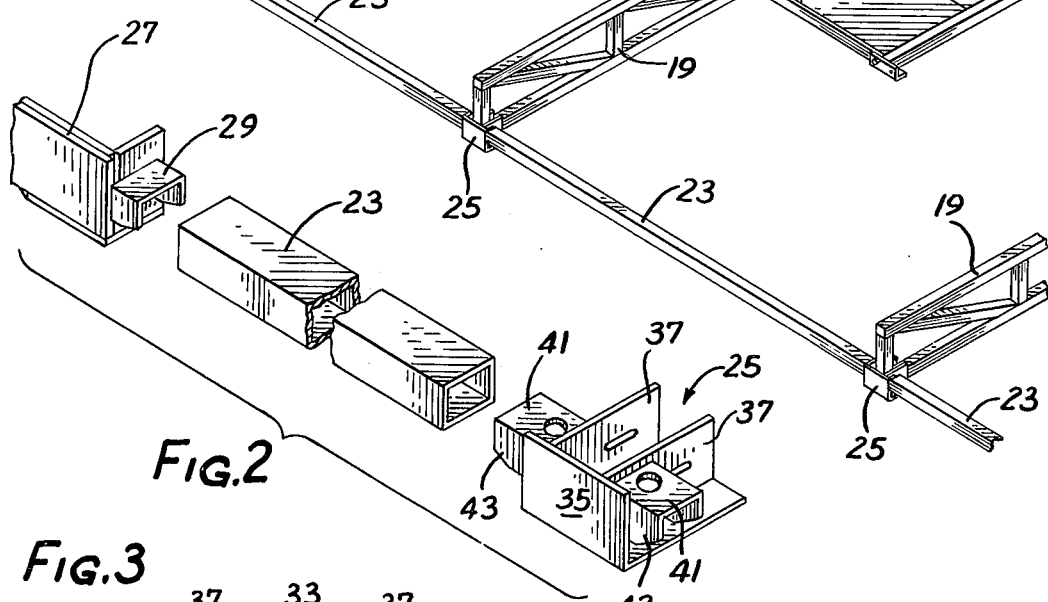
FIG. 2 is an exploded perspective view, enlarged in size, with portions broken away, illustrating the guiderail arrangement depicted in FIG. 1.

As best seen in FIG. 2, the spring entry assembly 27 includes a horizontally extending projection or socket 29 which is proportioned to interfit within the end of a length of tubular guiderail 23 of rectangular cross section and thereby support it in the desired location just slightly above floor level. As can be seen in FIG. 1, the spring entry assembly 27 is suitably attached to the base 19 at the end of the cantilever rack 11. If desired, a guiderail 31, which would be located along the edge of a main aisle, might optionally be located between the spring entry assembly 27 at one end of the base 19 and another spring entry assembly (not shown) at the opposite end of the same base 19.

Figure 3:
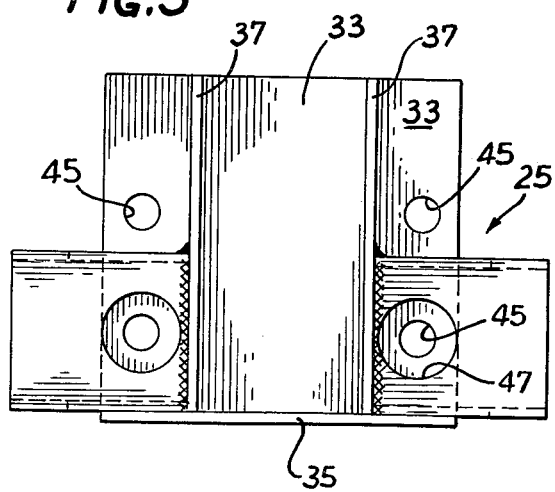
FIG. 3 is an enlarged plan view of the main guiderail support bracket shown in FIGS. 1 and 2.
Figure 4:
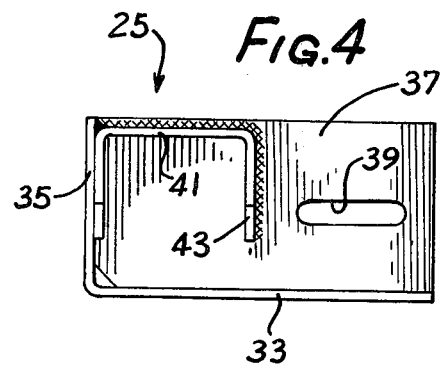
FIG. 4 is a right side elevation view of the main bracket shown in FIG. 3.

The dual support brackets 25 are illustrated in FIGS. 2, 3 and 4 and are adapted to mate with the terminal portions of the individual bases 19 of the cantilever rack. As a result of such mating, the weight of the loaded cantilever rack 11 is transferred to the dual brackets 25, providing an extremely stable support point for the ends of the lengths of tubular guiderail 23. The dual support bracket 25 is formed with a flat base plate section 33 which lies in contact with the floor and which plate is bent to have an upstanding front vertical section 35, that constitutes a short section of the overall continuous vertical guide surface adjacent the aisle.

The dual bracket 25 also includes a pair of parallel, vertical plates 37 which are suitably attached, as by welding, to the main bottom plate 33 and to its front vertical extension 35. The plates 37 are spaced apart a sufficient distance to accommodate therebetween the forwardmost, terminal portion of the cantilever rack base 19. Each of the plates 37 includes an elongated slot 39 through which the dual bracket 25 is secured to the base of the cantilever rack, by a bolt and nut (not shown), after it is in position. Each of the plates 37 includes an outwardly extending projection or socket 41 which has the general shape of a channel and which is similarly proportioned, as the projection or socket 29, to closely interfit within the rectangular, tubular, guiderail length 23. The flange portions of the channel-like socket 41 have a chamfer 43 at their ends to facilitate the easy mating with the guiderail 23.

As best seen in FIGS. 3 and 4, each of the sockets 41 is welded to the outer face of the vertical plate 37 and to the rear surface of the upstanding front plate section 35. Accordingly, when the guiderail 23 is installed on the socket 41, the guiderail abuts the side edge of the upstanding plate section 35 and provides a substantially continuous vertical surface as is shown in FIG. 1. The dual support bracket 25 is designed to be firmly secured to the warehouse floor, and to this end, four holes 45 are provided in the main plate 33 to accommodate suitable screws. Enlarged holes 47 are provided in the horizontal web of the sockets 41 to accommodate the passage of a socket therethrough to facilitate the installation of mounting screws through the forwardmost pair of holes 47 in the dual bracket.

The employment of tubes of rectangular cross section, particularly when the horizontal dimension of the tube is greater than its vertical dimension, results in an extremely stable guiderail arrangement which normally requires no intermediate support between adjacent bases 19 of the cantilever rack installation. The channel-shaped sockets 41 are proportioned to very closely approximate the interior shape of the hollow tubular guiderail 23 and thus establish a firm connection at the points of engagement with the dual brackets 25 and the guiderail. The erection of the illustrated arrangement depicted in FIG. 1 is fairly simply carried out because a bracket 25 need be installed only at the location of each cantilever rack base 19. For use with most fork trucks sold in the U.S. today, the span between bases 19 may be as long as 12 feet without requiring additional guiderail support other than the brackets 25. Because the end of the base 19 rests on the main plate 33 of the bracket, the load of the storage rack installation is effectively transferred in substantial amount to the bracket 25 and thus very considerably adds to the overall stability and rigidity that is provided by the illustrated guiderail arrangement 21.

Figure 5:
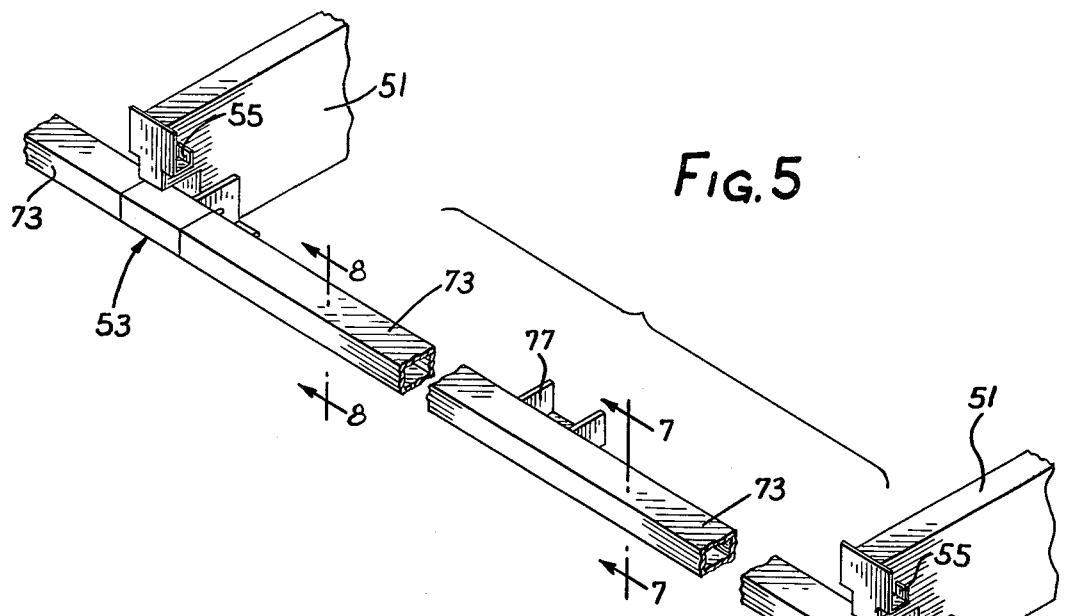
FIG. 5 is a fragmentary perspective view of an alternative embodiment of a guiderail arrangement embodying various features of the invention.
Figure 6:
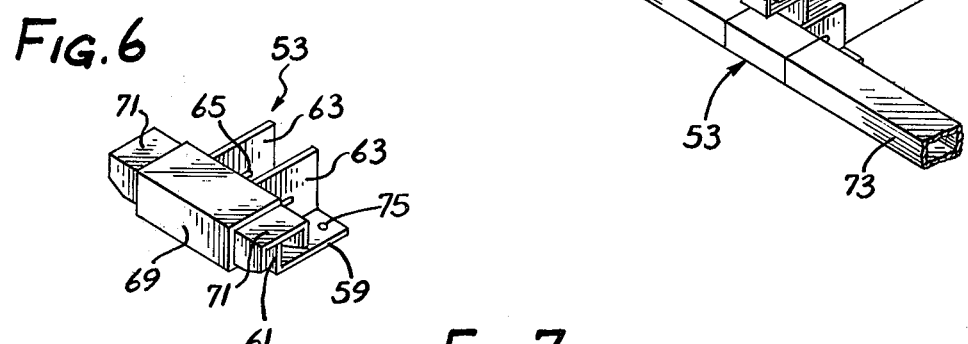
FIG. 6 is an enlarged perspective view of the main guiderail bracket shown in FIG. 5.

Shown in FIG. 5 is a modified type of cantilever rack arrangement wherein a pair of cantilever rack bases 51 are depicted which are designed to be spaced apart a distance substantially greater than the bases 19 shown in FIG. 1. The bases 51 have their outermost lower ends recessed so as to accommodate therebeneath dual support brackets 53 of a slightly different configuration. As best seen perhaps in FIG. 8, each of the cantilever rack bases 51 is provided with an upper front support bracket 55 designed to hold a 2 × 4 or the like which will provide a support for plywood decking or the like. The recess 57 is generally rectangular in shape and is disposed in the region just below the support bracket 55.

The dual support bracket 53 includes a main bottom plate 59 which is bent to have a short vertical front section 61. Suitably attached, as by welding, to the main plate 59 and to its front section 61 are a pair of parallel, vertical plates 63 which are spaced apart a sufficient distance to accommodate the width of the cantilever rack base 51 therebetween. The plates 63 have elongated slots 65 through which a bolt 67 can be passed to interconnect the dual support bracket 53 and the cantilever base 51.

Supported atop the upper edge of the short front plate section 61, and rigidly connected to the front edges of the parallel vertical plates 63, is a horizontal spacer 69 which is a short length of the same tubular material used for the guiderail. The spacer 69 supports a pair of sockets 71 extending from either end thereof which are similar in shape to the sockets 41 described hereinbefore and which function in the same manner. If desired, the sockets 71 can be provided by a single piece of channel iron which extends completely through the spacer 69 and protrudes from both ends. Alternatively, separate sections of channel iron can be provided and suitably secured to each end of the spacer 69 to create the two sockets 71. As illustrated in FIG. 5, each of the sockets 71 on the dual support bracket 53 receives an end of a length of guiderail 73, which it supports the desired distance above the floor level.

Figure 8:
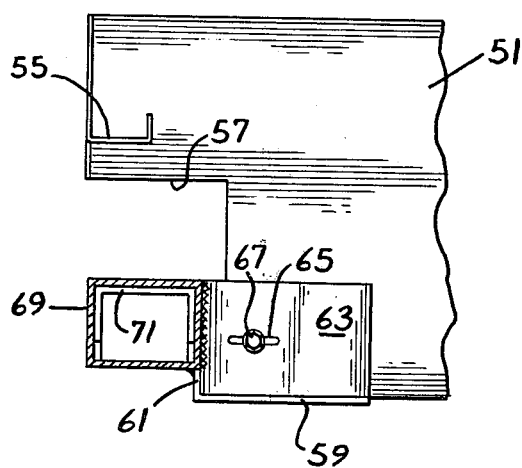
FIG. 8 is an enlarged sectional view taken generally along the line 8—8 of FIG. 5.

The spacer portion 69 of the bracket is accommodated in the recess 57 provided in the cantilever rack base 51 (as best seen in FIG. 8) so that the forwardmost vertical wall of the spacer 69 (and the guiderail 73) is substantially flush with the end face of the cantilever rack base 51. As in the case of the arrangement shown in FIGS. 1 through 4, the terminal portion of the bottom of the cantilever rack base 51 rests upon the upper surface of the main plate 59 of the dual support bracket and thus transfers a substantial amount of the weight of the loaded storage rack to the bracket 53, contributing stability and rigidity to the overall guiderail arrangement. In addition, the main plate 59 is provided with holes 75 through which screws are passed to anchor the dual support brackets 53 to the warehouse floor.

Figure 7:
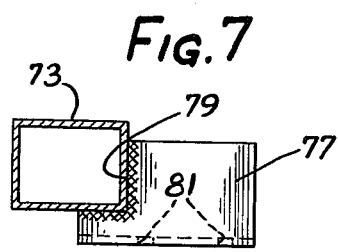
FIG. 7 is a sectional view showing an intermediate support bracket, which view is taken generally along line 7—7 of FIG. 5.

The cantilever rack support bases 51 may be spaced further apart than the bases 19 depicted in FIG. 1. Also, as earlier indicated, although a 12-foot span of guiderail need not be further supported for use with most fork trucks, whenever the spacing exceeds 12 feet or when the installation is designed for use with trucks which can exert substantially large lateral loads, it is desirable to include an intermediate brace 77 at about the midpoint between the bases 51. The brace 77 (see FIG. 7) may be a section of channel iron having a notch 79 cut in its upstanding flanges so as to fit just behind and under the guiderail 73. Four holes 81 are formed in the web of the channel iron through which suitable screws (not shown) are passed to anchor the brace 77 to the warehouse floor.

Figure 9:
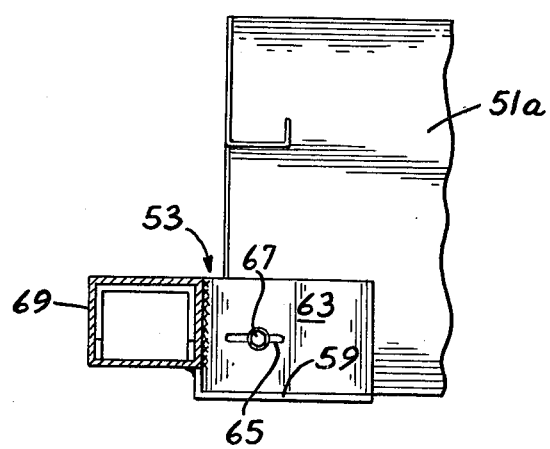
FIG. 9 is a sectional view similar to FIG. 8 showing an alternative embodiment of a storage rack-guiderail system.

Shown in FIG. 9 is an alternative embodiment wherein the dual support bracket 53 is being used with a cantilever rack base 51a which does not include a recess 57. In such an instance, the spacer 69 and thus the entire guiderail arrangement is located so that it extends a slight distance into the existing service aisle than in the embodiment depicted in FIG. 8. However, depending upon the precise type of mechanical lift equipment which will be employed, there may be an advantage to having the guiderail arrangement protrude a few inches from the outermost end surface of the cantilever rack base 51a. Likewise, it should be understood that the depth of the storage rack base might be slightly shorter than the length of the cantilever arm so that, even in the embodiment depicted in FIG. 9, the vertical guide surface of the guiderail arrangement could still be substantially in vertical alignment with the edge of the cantilever rack shelves.

Although the invention has herein been illustrated by reference to various preferred embodiments, it should be understood that the invention is not limited to the illustrative embodiments but is intended to include any modifications that might be made which would be obvious to one having the ordinary skill in the art. For example, the guiderail arrangement is not limited to use with cantilever racks, but it is also considered to be useful with other types of storage rack systems. For example, the guiderail arrangement may be employed with selective pallet racks of the general type illustrated in U.S. Pat. No. 2,932,368, issued Apr. 12, 1960. In such an instance, the spacing between the parallel vertical plates carried by the dual support brackets often would be made slightly greater so as to accommodate a tubular storage rack post.

Applicant has provided a relatively simple but extremely rigid guiderail system for use with storage racks that will be serviced by mechanical lift equipment. Whereas previous guiderail arrangements required significant erection time necessitated by drilling and anchoring an angle iron guiderail to the floor at relatively close intervals, this is obviated because of the rigidity which is obtained by the use of the illustrated tubular guiderail of rectangular cross section in connection with the dual brackets which provide extremely stable support points as a result of the combination of their being anchored to the floor plus carrying a substantial portion of the weight of the loaded storage rack.

Various of the features of the invention are set forth in the claims appended hereto.

What is claimed is:

1. A cantilever storage rack having support means in contact with the floor including an elongated base extending substantially the full depth of said rack to a location adjacent an aisle which provides access to the storage rack, a guiderail located along the aisle-defining edge of the storage rack and bracket means for holding said guiderail in desired position, said guiderail being tubular, and said bracket means including horizontally extending projections proportioned to closely interfit within said tubular guiderail, said base containing a recess in the lower portion of the outer end thereof adjacent the aisle, which recess accommodates a portion of said bracket means so that the outermost extension of said base is in general vertical alignment with the outermost extension of said guiderail and the load carried by the storage rack is transferred to said bracket means.

2. A storage rack incorporating a guiderail system comprising a storage rack having support means in contact with the floor at a location generally adjacent an aisle that provides access to the storage rack, a sectional tubular guiderail rectangular in cross section located along the aisle-defining edge of the storage rack, and a bracket mounting said guiderail in desired position, said bracket having a base plate portion disposed under and in contact with an outer portion of the storage rack support means adjacent the aisle to transfer the load carried by the storage rack to said bracket, a pair of lateral projections being affixed to a pair of upstanding vertical plates and extending horizontally therefrom in opposite directions, each of which projections has at least one horizontal wall and one vertical wall and is proportioned to closely interfit within one of said tubular guiderail sections, first aperture means in said vertical plates aligned with second aperture means in said support means, and connector means in said aligned aperture means interconnecting said rack support means and said bracket, said base plate extending laterally past said pair of vertical plates and containing holes therein, and fastener means extending through said holes and securing said bracket to the floor, said horizontal wall of each projection overlying one of said holes and having an access opening formed therein through which said fastener is inserted.

3. A storage rack in accordance with claim 2 wherein said bracket means includes a vertical-surface-providing element located between said projections, which vertical surface is flush with the outer vertical surface of said rectangular cross section guiderail.

* * * * *